(12) United States Patent
Gleason et al.

(10) Patent No.: US 12,542,151 B2
(45) Date of Patent: Feb. 3, 2026

(54) PROGRAMMABLE WRITER OVERDRIVE

(71) Applicant: Avago Technologies International Sales Pte. Limited, Singapore (SG)

(72) Inventors: Jeffrey A. Gleason, Burnsville, MN (US); Jason Paul Brenden, Lake Elmo, MN (US); Cameron Carroll Rabe, Inver Grove Heights, MN (US); Paul Mark Mazur, Cottage Grove, MN (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/957,149

(22) Filed: Nov. 22, 2024

(65) Prior Publication Data
US 2025/0342855 A1    Nov. 6, 2025

Related U.S. Application Data

(60) Provisional application No. 63/641,926, filed on May 2, 2024.

(51) Int. Cl.
  *G11B 5/00*    (2006.01)
  *G11B 5/02*    (2006.01)
(52) U.S. Cl.
  CPC .................................. *G11B 5/022* (2013.01)

(58) Field of Classification Search
  CPC ....... G11B 5/00; G11B 5/09; G11B 20/10009; G11B 20/10222; G11B 20/10
  USPC ...................................................... 360/75, 39
  See application file for complete search history.

(56) References Cited

U.S. PATENT DOCUMENTS

| | | | |
|---|---|---|---|
| 7,154,687 B2 | 12/2006 | Ikekame et al. | |
| 7,167,651 B2* | 1/2007 | Shpantzer | H04B 10/2563 398/205 |
| 7,660,064 B2 | 2/2010 | Howley et al. | |
| 9,111,561 B1 | 8/2015 | Contreras et al. | |
| 9,355,677 B2 | 5/2016 | Lammers et al. | |
| 10,164,650 B2* | 12/2018 | Lu | H03M 3/50 |
| 2003/0058504 A1* | 3/2003 | Cho | H04B 10/2543 398/147 |
| 2005/0111126 A1 | 5/2005 | Price, Jr. | |
| 2016/0260454 A1 | 9/2016 | Dina | |
| 2018/0012627 A1 | 1/2018 | Burkhardt et al. | |

* cited by examiner

*Primary Examiner* — Nabil Z Hindi
(74) *Attorney, Agent, or Firm* — Quarles & Brady LLP

(57) ABSTRACT

An apparatus including a current source. The current source divides a current from a voltage supply into current streams in response to converting a voltage from a voltage supply into a plurality of current streams. The current source modulates a current streams with signals to convert the current streams into first and second current streams. The current source combines the first and second current streams into a single current stream and supplies the single current stream to a load in a flow direction.

19 Claims, 10 Drawing Sheets

Portion of Head Current (IHead)

PROGRAMMABLE WRITER OVERDRIVE

CLAIM OF BENEFIT TO PRIOR APPLICATION

The present application claims the benefit of U.S. Provisional Patent Application 63/641,926, filed May 2, 2024. This patent application is incorporated herein by reference in its entirety for all purposes.

BACKGROUND

Hard disc drive (HDD) write drivers are electronic circuits responsible for converting digital data into current during the recording of data. An HDD write driver can control the current sent to a write head of a disc drive. Magnetic signals resulting from the current are written onto disc platters by the write head during the data recording.

BRIEF DESCRIPTION OF DRAWINGS

The accompanying drawings, which are incorporated in and form a part of this specification, illustrate examples of the disclosure and, together with the description, explain principles of the examples.

Figure 1:
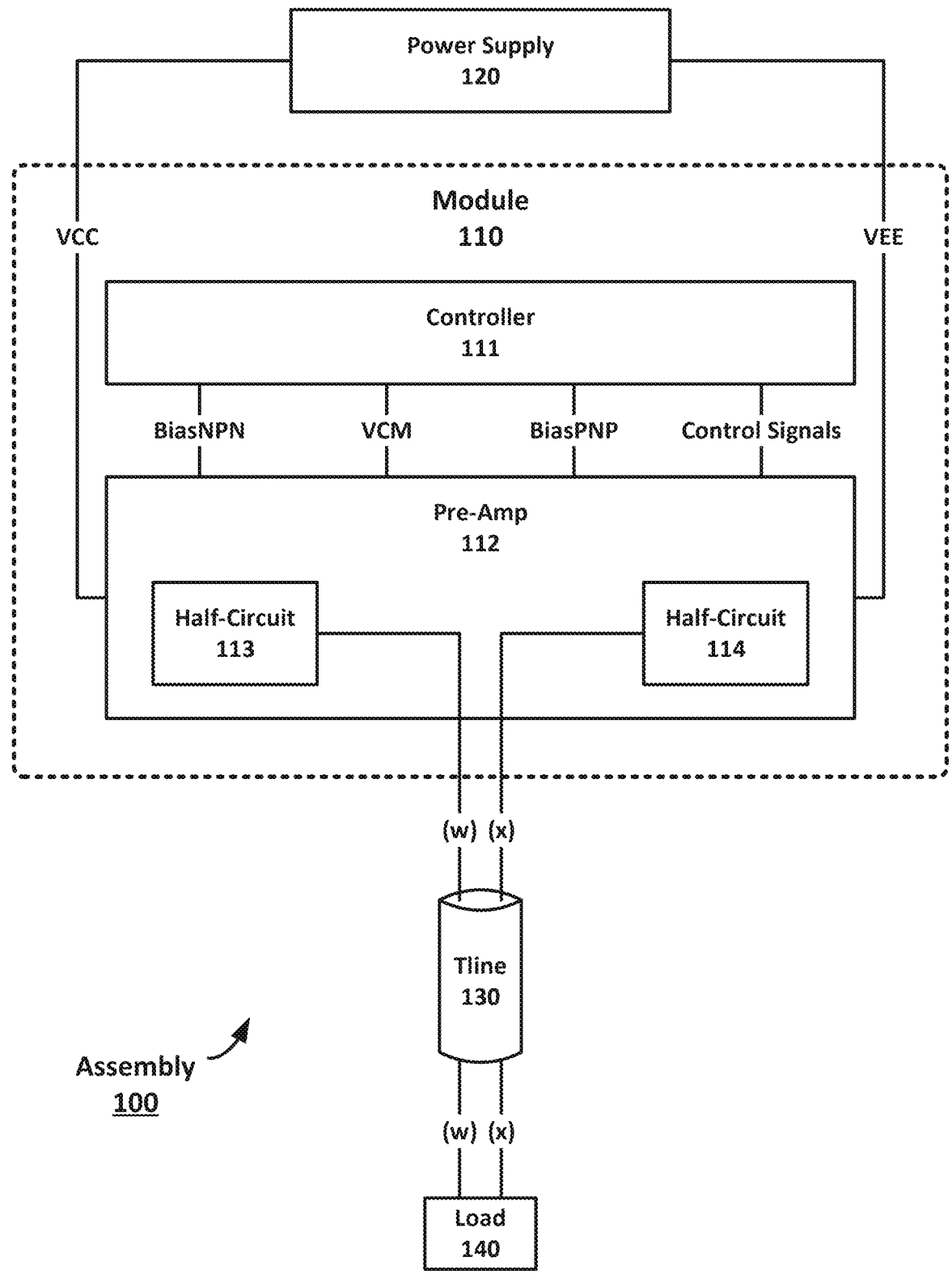
FIG. 1 illustrates an exemplary assembly, in accordance with one or more embodiments of the disclosure.

In the drawings, like reference symbols and numerals indicate the same or similar components. Like elements in the various figures are denoted by like reference symbols and numerals for consistency. Unless otherwise indicated, like elements and method steps are referred to with like reference numerals.

DETAILED DESCRIPTION OF THE INVENTION

The following describes technical solutions in this specification with reference to the accompanying drawings. Exemplary embodiments are described in detail with reference to the accompanying drawings.

The terminology used herein is for describing various examples only, and is not to be used to limit the disclosure. Unless otherwise defined, all terms, including technical and scientific terms, used herein have the same meaning as commonly understood by one of ordinary skill in the art to which this disclosure pertains and after an understanding of the disclosure of this application.

Terms, such as those defined in commonly used dictionaries, are to be interpreted as having a meaning that is consistent with their meaning in the context of the relevant art and the disclosure of this application. Although the present technology has been described by referring to certain examples, workers skilled in the art will recognize that changes may be made in form and detail without departing from the scope of the discussion.

As writer head current in HDD applications increases, an interconnect impedance is reduced to accommodate a launch voltage required to prevent saturation of the writer output drivers. However, lower impedance interconnects can suffer from reduced bandwidth and hence a slower head current response. Accordingly, there is a need in the art for an improved write driver.

Referring to FIG. 1, assembly 100 is illustrated. Assembly 100 may include module 110, power supply 120, flexible circuit Tline 130 and load 140. Those skilled in the art will appreciate there may be additional components in assembly 100.

Module 110 is an apparatus that may be implemented as a pre-driver, a pre-amplifier, a pre-stage driver, a signal conditioner, an intermediate driver, and/or any other electronic circuitry that may condition or amplify current on lines (w) and (x). For example, module 110 may convert supply voltages VCC and VEE into current and deliver the current to load 140 on lines (w) and (x), as will be explained in detail. In various implementations, a typical voltage level for supply voltage VCC may happen to be +5V and a typical voltage level for supply voltage VEE may happen to be −3V. Module 110 may include controller 111 and pre-amp 112.

Power supply 120 may convert power from an external power source into supply voltages VCC and VEE. Power supply 120 may output, to module 110, supply voltage VCC at a positive direct current (DC) voltage and supply voltage VEE at a constant negative DC voltage despite any fluctuation in load conditions on module 110 caused by Tline 130 and load 140.

Tline 130 may be implemented as a group of individual cables or wires that are bound together. Tline 130 may comprise multiple strands of wires. In some implementations, Tline 130 may be a flexible interconnect cable. Tline 130 may happen to be a low bandwidth, low impedance interconnect.

Load 140 is component having an impedance that module 110 may happen to be driving. For example, load 140 may be an electronic component, an electronic circuit, an electronic device, and/or any device that consumes electrical power. In some implementations, load 140 may be a read/write head in a hard disc drive.

Module 110 may include controller 111 and pre-amp 112. Controller 111 is electronic hardware implemented as any suitable processing circuitry. The processing circuitry may include, but not limited to at least one of a microcontroller, a microprocessor, a single processor, and a multiprocessor. Controller 111 may include at least one of an embedded controller (EC), a central processing unit (CPU), an accelerated processing unit (APU), an application specific integrated circuit (ASIC), field programmable gate arrays (FPGA), logic circuitry, a state machine, a programmable processor, or the like. Controller 111 may be implemented as electronic hardware that may include digital circuits, analog circuits or a combination of both digital and analog circuits. Analog circuits may include analog components that are suitable to process analog gate signals. Digital circuits may include switches and gates that are suitable to process digital gate signals.

Figure 2:
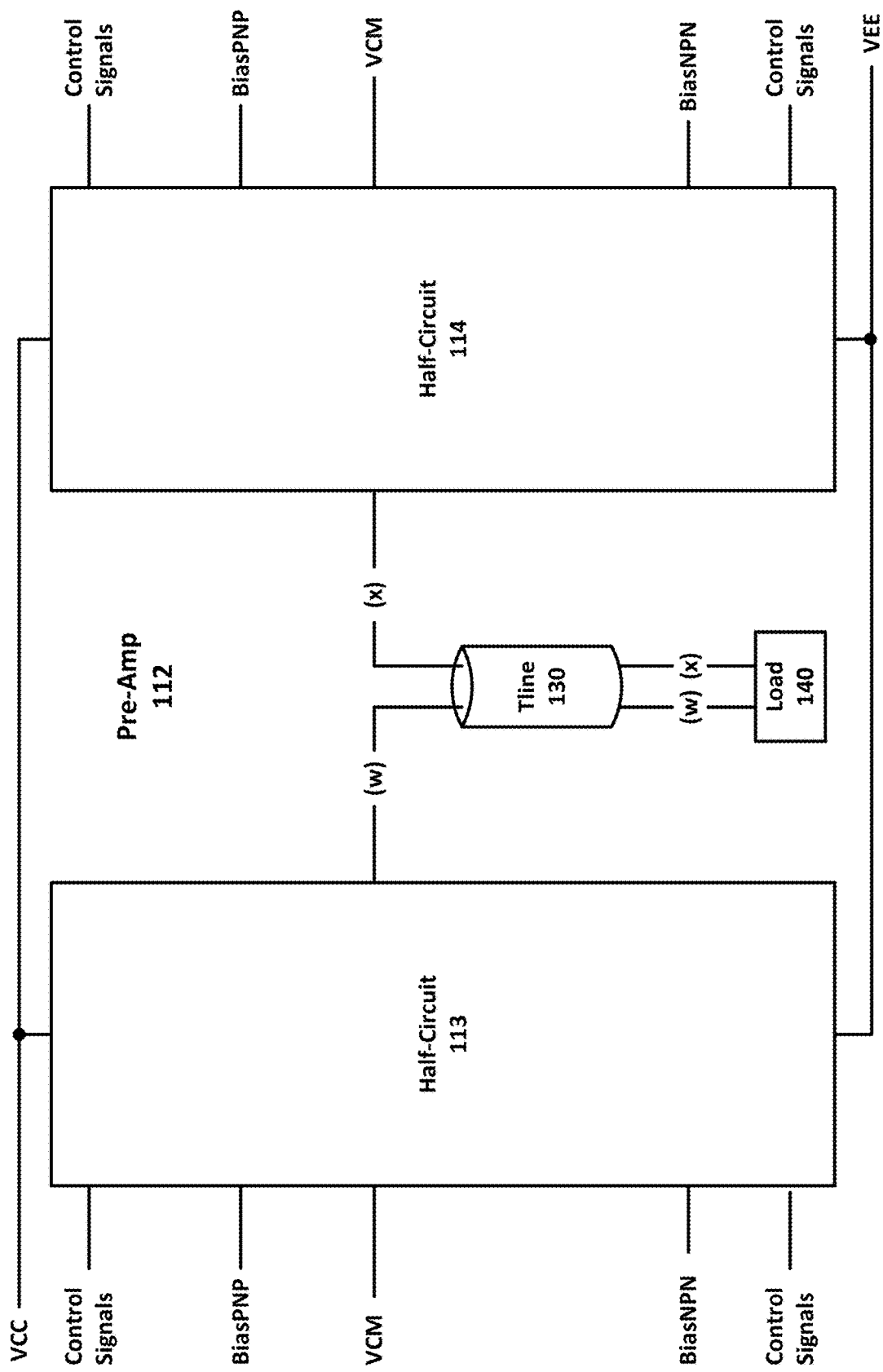
FIG. 2 illustrates an exemplary pre-amp, in accordance with one or more embodiments of the disclosure.

Referring to FIG. 2, pre-amp 112 is illustrated. In the example of FIG. 2, pre-amp 112 may include half-circuits 113 and 114, which are symmetrical circuits. Half-circuit 113 may be referred to herein as a "first half-circuit" and half-circuit 114 may be referred to herein as a "second half-circuit." Also referred to herein, "symmetrical circuits" are circuits where components and pathways are arranged in a mirror-like configuration on either side of load 140.

Figure 3:
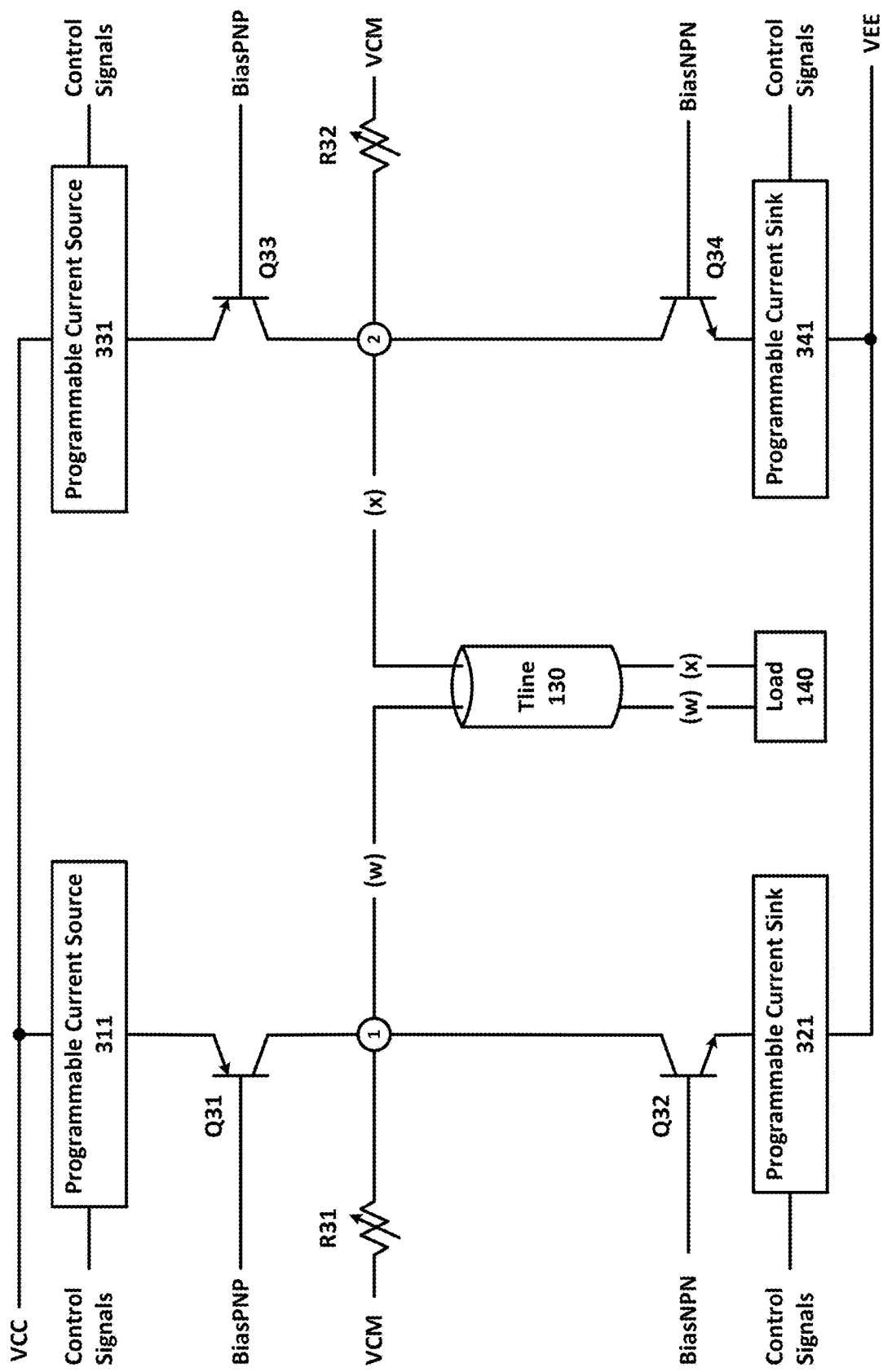
FIG. 3 illustrates an exemplary half-circuit, in accordance with one or more embodiments of the disclosure.

Referring to FIG. 3, half-circuit 113 may include several components such as biasing transistors Q31-Q32, programmable current source 311, variable resistance R31 and programmable current sink 321. Half-circuit 114 may include several components such as biasing transistors Q33-Q34, programmable current source 331, variable resistance R32 and programmable current sink 341. Those skilled in the art will appreciate that load 140 may be in series with half-circuits 113 and 114, with load 140 being between half-circuit 113 and half-circuit 114. Those skilled in the art will appreciate there may be additional components in pre-amp 112.

Referred to herein, a programmable current source is an electronic circuit that provides an adjustable amount of current to load 140. Half-circuit 113 may include programmable current source 311. Half-circuit 114 may include programmable current source 331. Control signals from controller 111 may regulate the amount of current that programmable current sources 311 and 331 may individually supply to load 140.

Referred to herein, a programmable current sink is an electronic circuit that may draw an adjustable amount of current from a current source. Half-circuit 113 may include programmable current sink 321. Half-circuit 114 may include programmable current sink 341. Control signals from controller 111 may regulate the amount of current that programmable current sinks 321 and 341 may draw from programmable current source 311 and 331, respectively.

Half-circuit 113 may include biasing transistors Q31 and Q32. Half-circuit 114 may include biasing transistors Q33 and Q34. Biasing transistors Q31, Q32, Q33 and Q34 may be implemented as bipolar transistors. However, those skilled in the art will appreciate that any of the biasing transistors Q31, Q32, Q33 and Q34 may be implemented as a Laterally-Diffused Metal-Oxide Semiconductor (LDMOS) transistor, a Field Effect Transistor (FET), a metal-oxide-semiconductor (NMOS or PMOS) transistor and/or any other switching device. Controller 111 may output BiasPNP, which is a direct current (DC) static voltage, to the base of PNP biasing transistors Q31 and Q33. Controller 111 may output BiasNPN, which is another DC static voltage, to the base of NPN biasing transistors Q32 and Q34. Referred to herein, "DC static voltage" is a constant voltage.

Regarding half-circuits 113 and 114, half-circuit 113 may include variable resistance R31 and half-circuit 114 may include variable resistance R32. Variable resistances R31 and R32 may each exist as a dynamically adjustable variable resistance. A variable resistance is an electrical resistance whose resistive value is adjustable. A dynamically adjustable variable resistance is an electrical resistance whose resistive value is adjustable electronically. Controller 111 may electronically adjust the resistive value variable resistances R31 and R32, individually and respectively. A user-defined setting may establish the resistive value for any of the variable resistances R31 and R32.

Being variably adjustable, variable resistances R31 and R32 may individually regulate resistances in pre-amp 112. For example, variable resistance R31 may regulate a resistance that happens to appear at node 1. Node 1 may be a connection terminal for half-circuit 113. The connection terminal for half-circuit 113 may be referred to herein as a first connection terminal. Variable resistance R32 may regulate a resistance that happens to appear at node 2. Node 2 may be a connection terminal for half-circuit 114. The connection terminal for half-circuit 114 may be referred to herein as a second connection terminal. Variable resistances R31 and R32 may each receive a signal VCM. Signal VCM is a DC voltage set at half way between supply voltages VCC and VEE in some instances.

Pre-amp 112 may exist as an H-bridge. An H-bridge is an electronic circuit that enables current to be applied through load 140 in either direction. Load 140 is connected between the two "legs" of the H-bridge. With programmable current source 311 and 331, programmable current sink 321 and 341 and biasing transistors Q31, Q32, Q33, Q34 as the four legs of the letter "H," controller 111 may output control signals that regulate a flow of current through load 140 in a forward direction and a reverse direction on lines (w) and (x) so that current may be applied in either direction through load 140. In some instances, the forward direction may be a flow direction and the reverse direction may be a direction opposite to flow direction. In other instances, the reverse direction may be the flow direction and the forward direction may be the direction opposite to flow direction.

Figure 4:
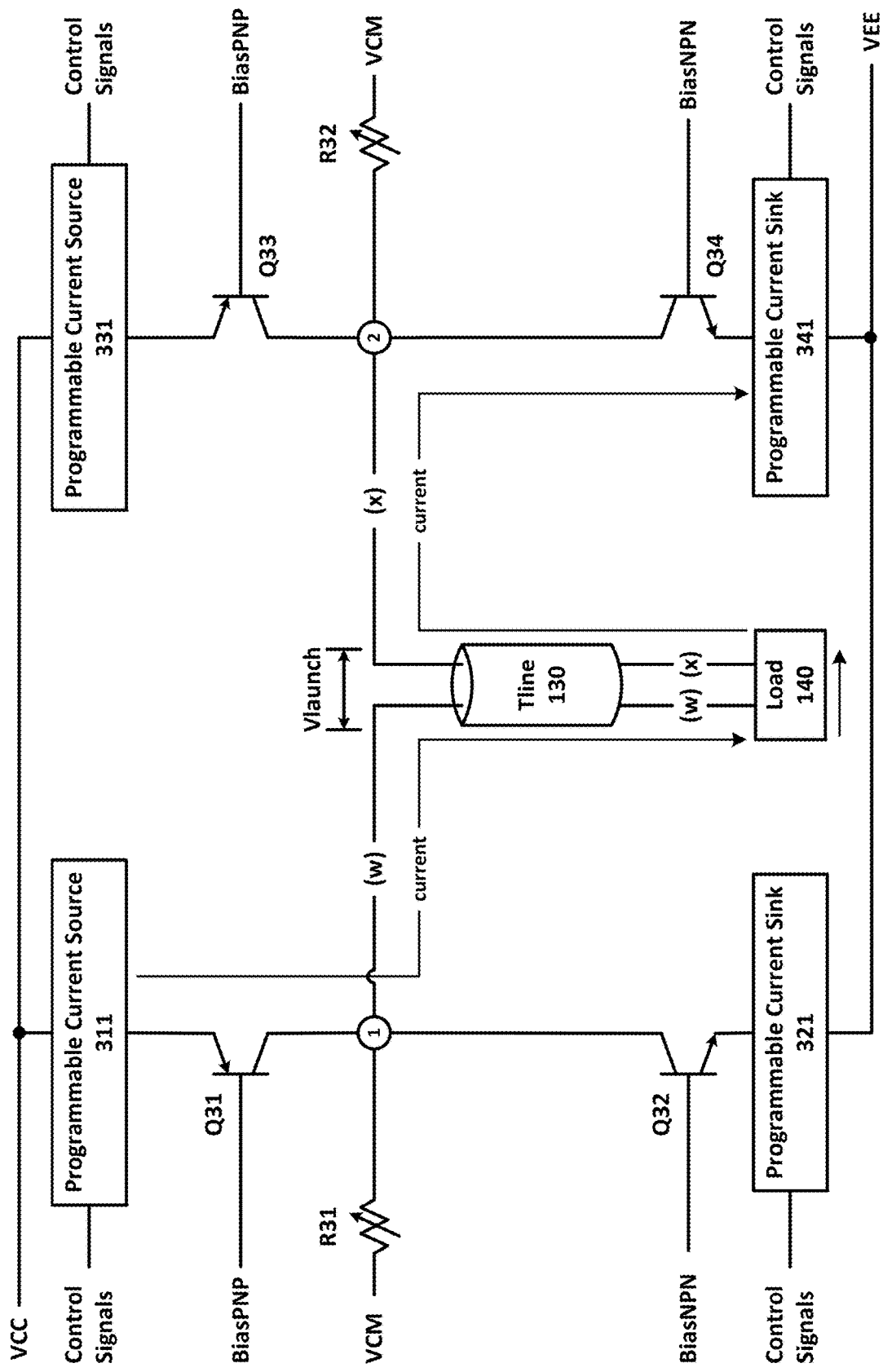
FIG. 4 illustrates an exemplary current flow, in accordance with one or more embodiments of the disclosure.

The example of FIG. 4 illustrates a case where controller 111 may control current through load 140 flow in a forward direction. Load 140 may be a write head for a hard disc drive. In hard disc drive applications, write head current may be programmable. In such an instance, controller 111 may output control signals that activate programmable current source 311 in tandem with activating programmable current sink 341. In this the configuration, current from programmable current source 311 may flow onto line (w) of Tline 130 through biasing transistors Q31. Current may flow in the forward direction onto line (w) of Tline 130 from node 1 and into load 140. Across lines (w) and (x), a launch voltage (Vlaunch) is the voltage level applied at the input of Tline 130. Current may flow in the forward direction into node 2 from load 140 through line (x) of Tline 130. Through biasing transistor Q34, current in the forward direction may flow into programmable current sink 341 from node 2.

Figure 5:
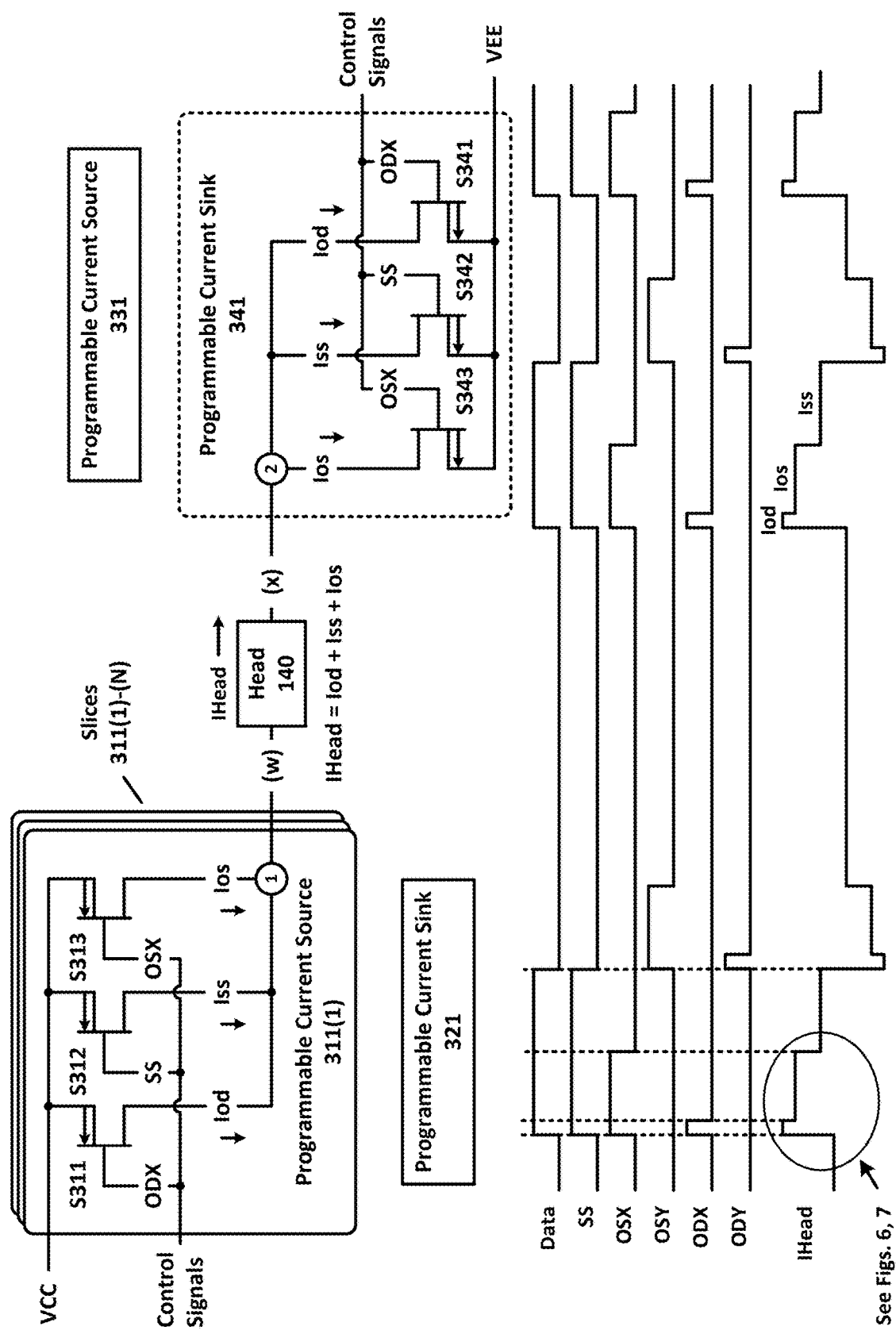
FIG. 5 illustrates an exemplary timing diagram, in accordance with one or more embodiments of the disclosure.

Turning now to the FIG. 5, some configurations may cause a flow of current through the load 140 in the forward direction. Programmable current source 311 may include slices 311(1)-(N), with "N" being an integer. Slices 311(1)-(N) may be collectively referred to as "programmable current source 311." Any one of the slices 311(1)-(N) may be individually referred to as "programmable current source 311." Each slice 311 may include switches S311-S313 as configured in the example programmable current source 311(1). Programmable current sink 341 may include switches S341-S343. Those skilled in the art will appreciate there may be additional components in programmable current source 311 and in programmable current sink 341.

Any of the switches S311-S313, S341-S343 in FIG. 5 may be implemented either as a single switch or as multiple switches. Furthermore, any of the switches S311-S313, S341-S343 may be implemented as a Field Effect Transistor (FET), a metal-oxide-semiconductor (NMOS or PMOS) transistor and/or any other switching device. Being that biasing transistors Q31 and Q34 are conductive and present in the example of FIG. 5, biasing transistors Q31 and Q34 are not shown in FIG. 5 for simplicity and ease of understanding.

To regulate the amount of current that programmable current sink 341 may draw from programmable current source 311, controller 111 may generate control signals in the form of a steady state signal (SS), forward overshoot signal (OSX), reverse overshoot signal (OSY), forward overdrive signal (ODX), and reverse overdrive signal (ODY).

Using parallel branches with switches S311-S313, a slice 311 may divide current from voltage supply 120 into a plurality of current streams. The slice 311 may regulate the distribution of current among the streams based on the timing and periodicity of the steady state signal (SS), forward overshoot signal (OSX) and forward overdrive signal (ODX), as illustrated by the example of FIG. 5.

For instance, switch S311 may modulate one of current streams with forward overdrive signal (ODX) to produce an overdrive current (Iod) that mirrors forward overdrive signal (ODX). Switch S312 may modulate one of current streams with steady state signal (SS) to produce a steady state current (Iss) that mirrors steady state signal (SS). Switch S313 may modulate one of current streams with forward overshoot signal (OSX) to produce an overshoot current (Ios) that mirrors forward overshoot signal (OSX). Controller 111 may activate or deactivate a number of slices 311 to regulate the total amplitude (see PW Height in FIG. 6) of the overdrive current (Iod). Switch S311 in each slice 311 may adjust the amplitude (PW Height) of the overdrive current (Iod).

Steady state current (Iss) may transition along with the transitioning of the data as illustrated in the timing diagram in FIG. 5. Having a pulse width shorter than the pulse width of steady state current (Iss), overshoot current (Ios) may transition at the rising edge of the data. Overshoot current (Ios) may ensure complete saturation of the magnetics in the disc. Having a pulse width shorter than the pulse width of overshoot current (Ios), overdrive current (Iod) may also transition at the rising edge of the data in FIG. 5.

Head current (IHead), which may flow through head 140, happens to be the sum total of the overdrive current (Iod), the steady state current (Iss) and the overshoot current (Ios) so that:

$$IHead = Iod + Iss + Ios$$

Figure 10:
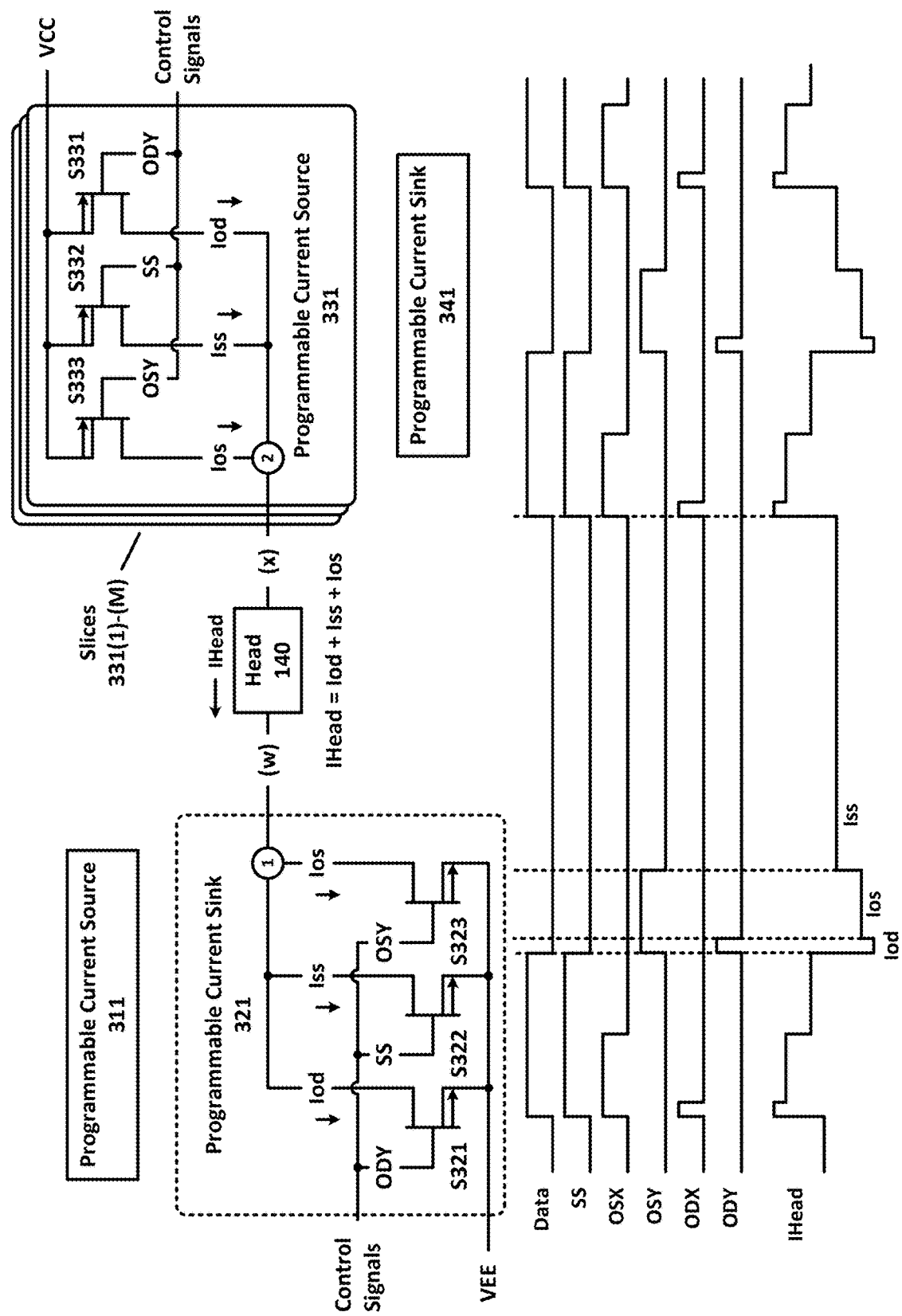
FIG. 10 illustrates an exemplary timing diagram, in accordance with one or more embodiments of the disclosure.

The timing diagrams in FIGS. 5 and 10 may illustrate a signal profile for head current (IHead).

Preamp 112 may apply the launch voltage (Vlaunch) at the input of Tline 130 at a voltage level that overdrives Tline 130 for a short time duration. As a result of overdriving Tline 130, preamp 112 may boost the transient response of head current (IHead) and reduce the rise time of head current (IHead) at head 140. Current levels for head current (IHead) are programable, as illustrated by the example of FIGS. 5 and 10.

As previously noted, current levels for head current (IHead) are programmable in both amplitude and duration in a way that may tailors the response for head current (IHead) to the characteristics of Tline 130. Half-circuit 113 may drive head current (IHead) for head 140 onto Tline 130 at node 1.

Figure 6:
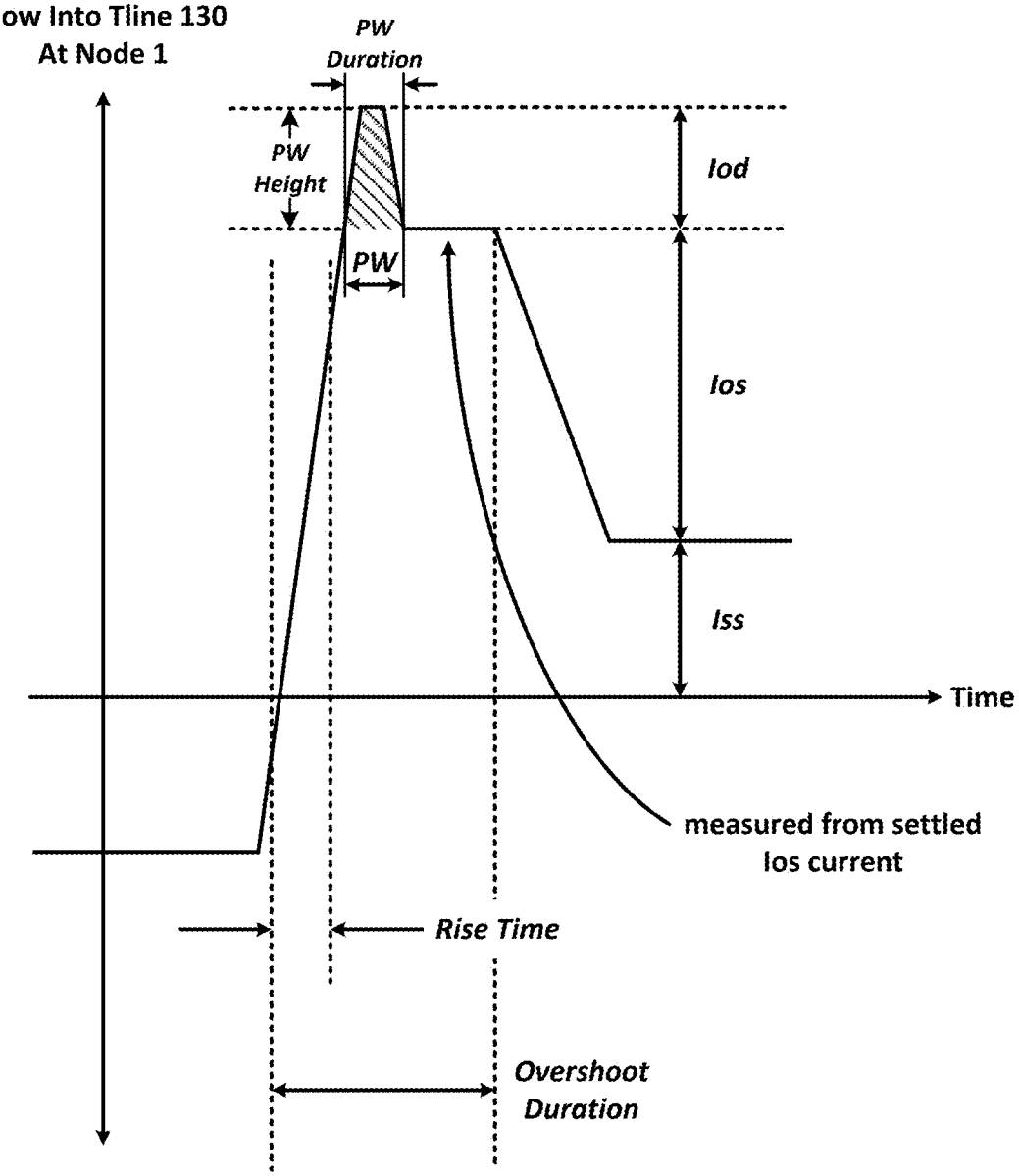
FIG. 6 illustrates an exemplary current profile, in accordance with one or more embodiments of the disclosure.
Figure 7:
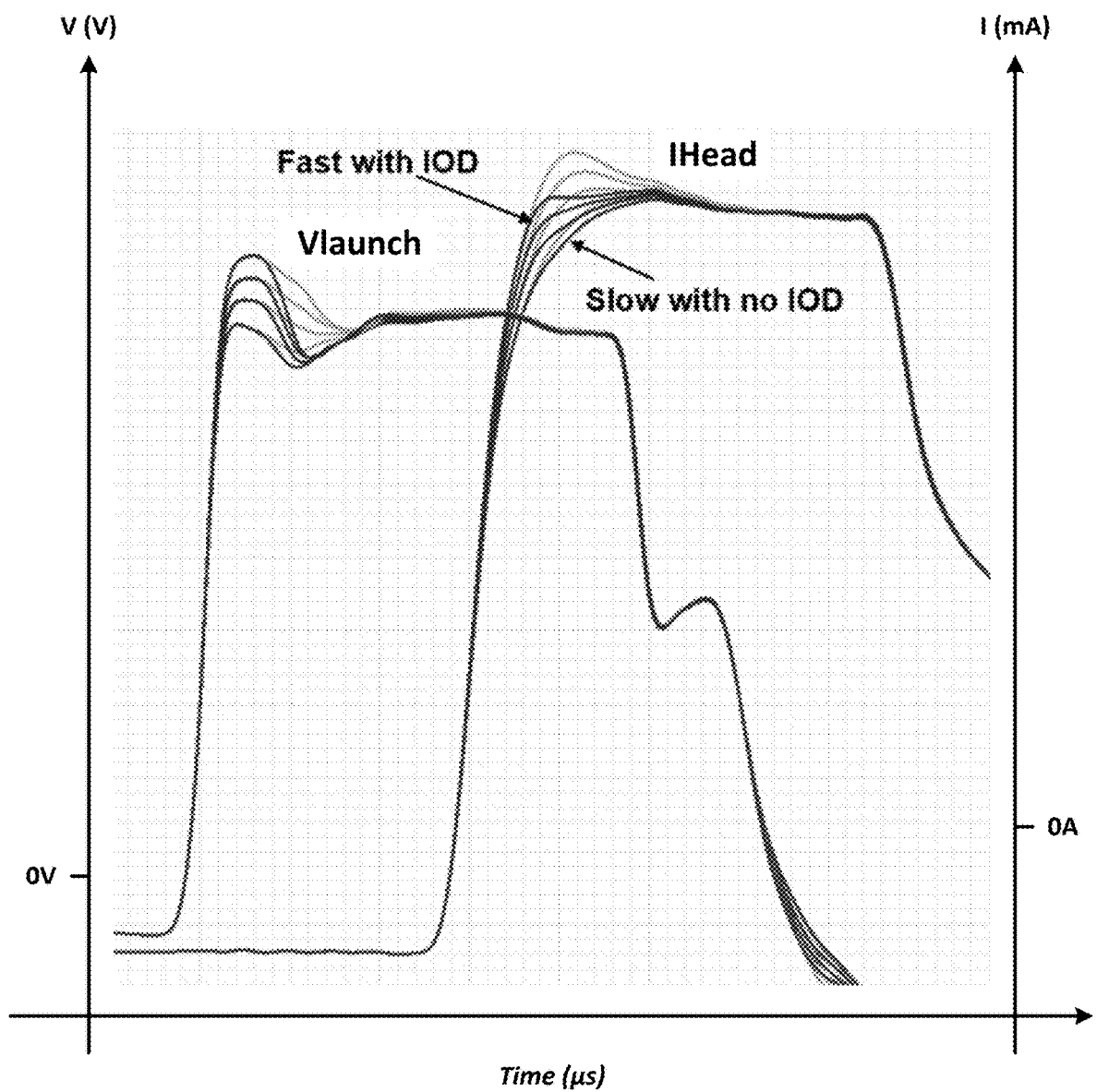
FIG. 7 illustrates exemplary waveforms, in accordance with one or more embodiments of the disclosure.
Figure 8:
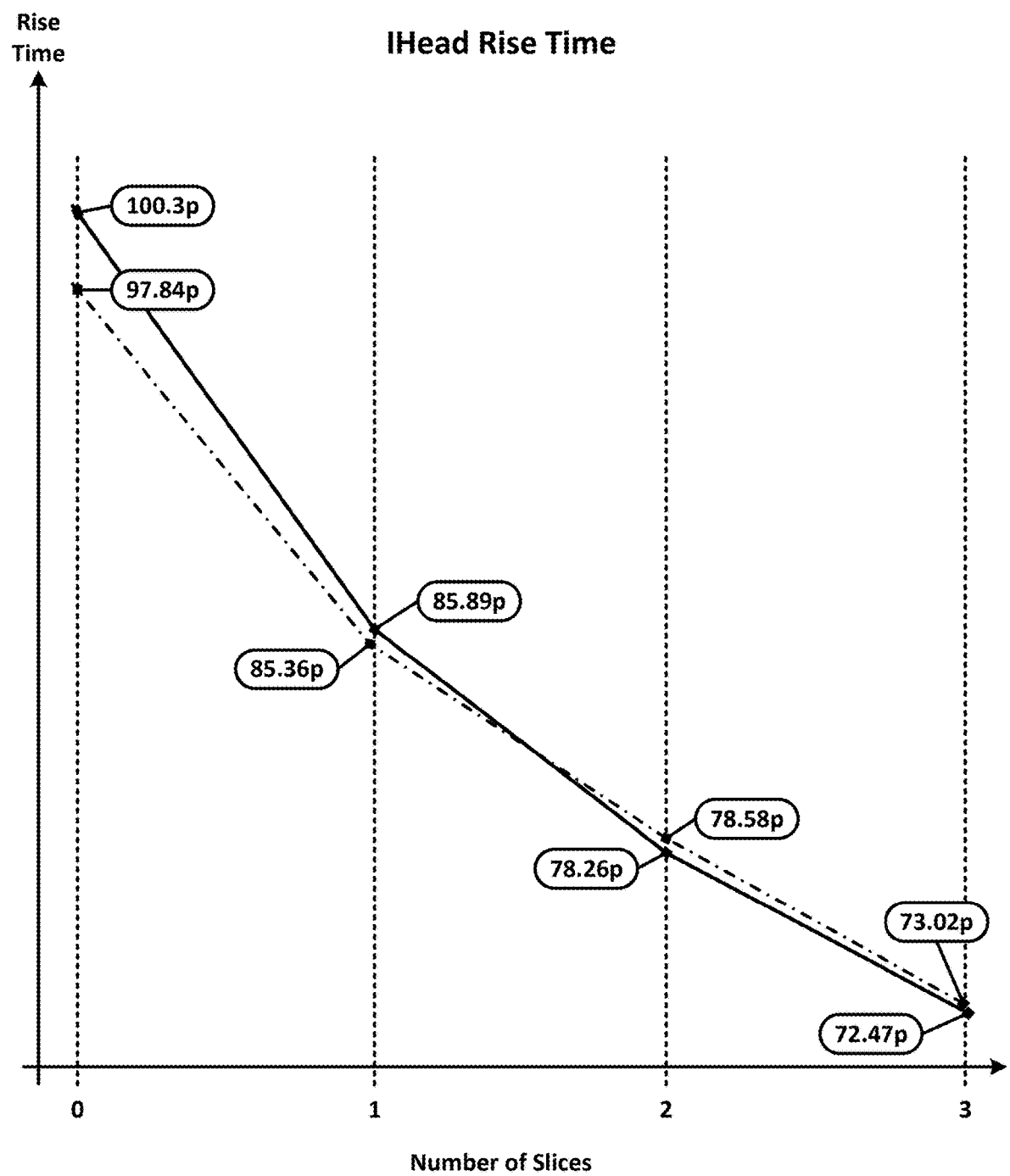
FIG. 8 illustrates exemplary relationship, in accordance with one or more embodiments of the disclosure.

Examples of head current (IHead) are illustrated in FIGS. 6, 7 and 8. Referred to herein, a rise time is the time duration from 10% to 90% of the peak of the head current (IHead). As demonstrated by the waveforms of FIGS. 6, 7 and 8, the addition of the overdrive current (Iod) to head current (IHead) improves the rise time of the head current (IHead) at head 140.

Referring to FIG. 6, a profile for head current (IHead) at node 1 during a transitioning of the data is illustrated. Prior to the head current (IHead) leveling off at the steady state current (Iss), head current (IHead) may happen to be at least a level resulting from the overshoot current (Ios). The hatched portion of the profile in FIG. 6 is a pulse resulting from the overdrive current (Iod). The pulse resulting from the overdrive current (Iod) is of a pulse width (PW) shorter than the overshoot duration.

Referring to FIG. 7, waveform plots are illustrated. The leftmost plot illustrates various examples of the launch voltage (Vlaunch) at the input of Tline 130. The launch voltage (Vlaunch) may follow a profile similar to the profile illustrated in FIG. 6 for head current (IHead). In comparison with the leftmost plot, the rightmost plot illustrates various examples of head current (IHead) at head 140. For instance, in the absence of an overdrive current (Iod) (Slow with no IOD), the transitioning edge of the head current (IHead) at head 140 may happen to be slow and rounded near the settled high level.

By comparison, an increase in the amplitude (PW Height) of the overdrive current (Iod) pulse may sharpen (Fast with IOD) the transitioning edge of the head current (IHead) at head 140, as illustrated by the darker-shaded curves in the rightmost plot of FIG. 7. Similarly, an increase in the duration (PW Duration) of the overdrive current (Iod) pulse may also sharpen (Fast with IOD) the transitioning edge of the head current (IHead) at head 140, as illustrated by the lighter-shaded curves in the rightmost plot of FIG. 7. The overdrive current (Iod) pulse widths (PW) in lighter-shaded curves of FIG. 7 be of longer durations than the darker-shaded curves.

Increasing the amount of overdrive current (Iod) may increase the amplitude (PW height) of the overdrive current (Iod). Likewise, decreasing the amount of overdrive current (Iod) may decrease the amplitude (PW height) of the overdrive current (Iod). In the absence of the overdrive current (Iod), FIG. 7 illustrates that the head current (IHead) response is slow and rounded near the settled high level. But in cases where the PW height of the overdrive current (Iod) is increased, FIG. 7 illustrates that the waveform for the head current (IHead) sharpens and rise time for the head current (IHead) improves.

FIG. 8 illustrates a relationship between the number of slices 311 that controller 111 may activate and the rise time of the head current (IHead). Each slice 311 may individually supply an amount of the overdrive current (Iod). Controller 111 may activate or deactivate slices 311(1)-(N) in programmable current source 311 to regulate the total amount of overdrive current (Iod) that programmable current source 311 may supply.

Referring to FIG. 8, example rise times for overdrive current (Iod) are illustrated. The dot-dashed line in FIG. 8 is associated with the lighter-shaded curves of FIG. 7. The solid line in FIG. 8 is associated with the darker-shaded curves of FIG. 7. Controller 111 may increase the number of slices 311 that are activated to increase the amplitude (PW height) of the overdrive current (Iod). On such occasions, an increase in the number of slices 311 that are activated may cause a decrease in rise time for overdrive current (Iod), as illustrated in FIG. 8. Likewise, controller 111 may decrease the number of slices 311 that are activated to decrease the amplitude (PW height) of the overdrive current (Iod). The decrease in the number of slices 311 that are activated may cause an increase in rise time for overdrive current (Iod), as also depicted in FIG. 8.

As illustrated by the examples of FIGS. 6, 7 and 8, inclusion of the overdrive current (Iod) improves rise time of head current (IHead), which will allow HDD developers to operate at higher data rates and have improved magnetic saturation on the disk surface. For instance, preamp 112 may overcome electrical bandwidth limitations of Tline 130 while driving head current (IHead) to the head 140 as a consequence of incorporating the overdrive current (Iod) into the head current (IHead). Improving the rise time of the head current (IHead) by the addition of the overdrive current (Iod) to head current (IHead) produces unexpectedly good results.

Figure 9:
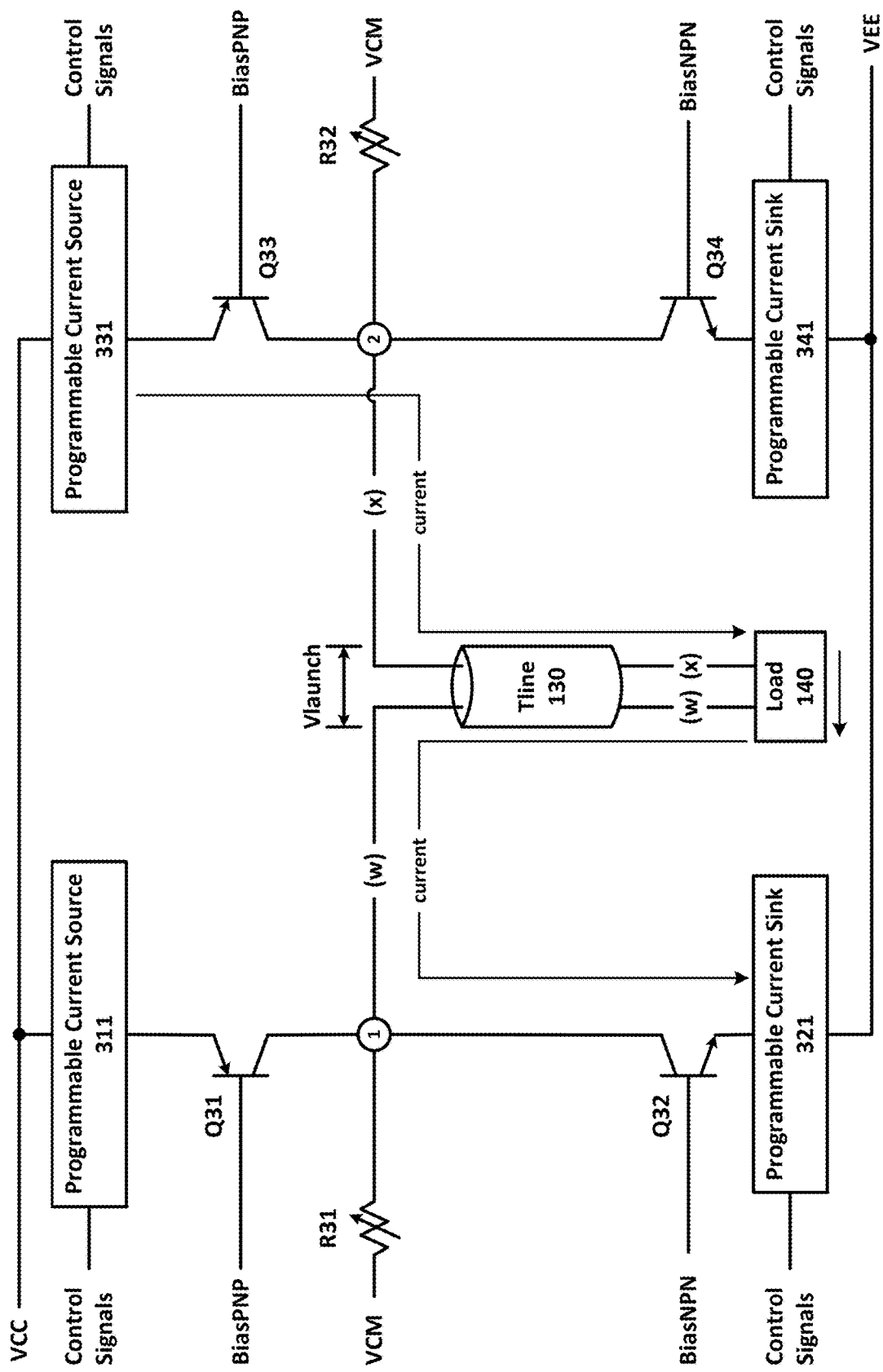
FIG. 9 illustrates an exemplary current flow, in accordance with one or more embodiments of the disclosure.

The example of FIG. 9 illustrates a case where controller 111 may control current through load 140 flow in a reverse direction. In such an instance, controller 111 may output control signals that activate programmable current source 331 in tandem with activating programmable current sink 321. In this the configuration, current from programmable current source 331 may flow onto line (x) of Tline 130 through biasing transistors Q33. Current may flow in the reverse direction onto line (x) of Tline 130 from node 2 and into load 140. Across lines (w) and (x), the launch voltage (Vlaunch) is the voltage level applied at the input of Tline 130. Current may flow in the reverse direction into node 1 from load 140 through line (w) of Tline 130. Through biasing transistor Q32, current in the reverse direction may flow into programmable current sink 321 from node 1.

Turning now to the FIG. 10, some configurations may cause a flow of current through the load 140 in the reverse direction. Programmable current source 331 may include slices 331(1)-(M), with "M" being an integer. Slices 331(1)-(M) may be collectively referred to as "programmable current source 331." Any one of the slices 331(1)-(M) may be individually referred to as "programmable current source 331." Each slice 331 may include switches S331-S333 as configured in the example programmable current source 331(1). Programmable current sink 321 may include switches S321-S323. Those skilled in the art will appreciate there may be additional components in programmable current source 331 and in programmable current sink 321.

Any of the switches S321-S323, S331-S333 in FIG. 10 may be implemented either as a single switch or as multiple switches. Furthermore, any of the switches S321-S323, S331-S333 may be implemented as a Field Effect Transistor (FET), a metal-oxide-semiconductor (NMOS or PMOS) transistor and/or any other switching device. Being that biasing transistors Q32 and Q33 are conductive and present in the example of FIG. 10, biasing transistors Q32 and Q33 are not shown in FIG. 10 for simplicity and ease of understanding.

Reverse overdrive signal (ODY) may cause switch S331 to generate an overdrive current (Iod). In some configurations, switch S331 may variably regulate the pulse width (PW) of the overdrive current (Iod). For instance, switch S331 may variably regulate the duration (PW Duration) of pulse width (PW) of the overdrive current (Iod). Switch S331 may variably regulate the amplitude (PW Height) of pulse width of the overdrive current (Iod). Steady state signal (SS) may cause switch S332 to generate a steady state current (Iss). Reverse overshoot signal (OSY) may cause switch S333 to generate an overshoot current (Ios). Reverse overdrive signal (ODY) may cause switch S321 to sink an overdrive current (Iod). Steady state signal (SS) may cause switch S322 to sink a steady state current (Iss). Reverse overshoot signal (OSY) may cause switch S323 to sink an overshoot current (Ios).

Using parallel branches with switches S331-S333, a slice 331 may divide current from voltage supply 120 into a plurality of current streams. The slice 331 may regulate the distribution of current among the streams based on the timing and periodicity of the steady state signal (SS), reverse overshoot signal (OSY) and reverse overdrive signal (ODY), as illustrated by the example of FIG. 10.

For instance, switch S331 may modulate one of current streams with reverse overdrive signal (ODY) to produce an overdrive current (Iod) that mirrors reverse overdrive signal (ODY). Switch S332 may modulate one of current streams with steady state signal (SS) to produce a steady state current (Iss) that mirrors steady state signal (SS). Switch S333 may modulate one of current streams with reverse overshoot signal (OSY) to produce an overshoot current (Ios) that mirrors reverse overshoot signal (OSY). Controller 111 may activate or deactivate a number of slices 331 to regulate the total amplitude (see PW Height in FIG. 6) of the overdrive current (Iod). Switch S331 in each slice 331 may adjust the amplitude (PW Height) of the overdrive current (Iod).

Steady state current (Iss) may transition along with the transitioning of the data as illustrated in the timing diagram in FIG. 10. Having a pulse width shorter than the pulse width of steady state current (Iss), overshoot current (Ios) may transition at the falling edge of the data. Overshoot current (Ios) may ensure complete saturation of the magnetics in the disc. Having a pulse width shorter than the pulse width of overshoot current (Ios), overdrive current (Iod) may also transition at the falling edge of the data in FIG. 10. A launch voltage (Vlaunch) may appear across head 140.

This new technique of generating overdrive current (Iod) is shown to improve the head current (IHead) rise time, which will allow HDD developers to operate at higher data rates and have improved magnetic saturation on the disk surface.

Those skilled in the art will also appreciate the arrangement or interconnection of components such as "coupled," "connected," "on," "under," or similar wording allows for indirect connections, or intervening components or layers.

Certain operations of methods according to the technology, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, may be executed in different orders than are expressly illustrated or described, as appropriate for particular examples of the technology. Further, in some examples, certain operations may be executed in parallel or partially in parallel, including by dedicated parallel processing devices, or separate computing devices configured to interoperate as part of a large system.

As used herein, unless otherwise limited or defined, "or" indicates a non-exclusive list of components or operations that may be present in any variety of combinations, rather than an exclusive list of components that may be present only as alternatives to each other. For example, a list of "A, B, or C" indicates options of: A; B; C; A and B; A and C; B and C; and A, B, and C.

Correspondingly, the term "or" as used herein is intended to indicate exclusive alternatives only when preceded by terms of exclusivity, such as, e.g., "either," "only one of," or "exactly one of." Further, a list preceded by "one or more" (and variations thereon) and including "or" to separate listed elements indicates options of one or more of any or all of the listed elements.

For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C.

Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

In general, the term "or" as used herein only indicates exclusive alternatives (e.g., "one or the other but not both") when preceded by terms of exclusivity, such as, e.g., "either," "only one of," or "exactly one of."

Any mark, if referenced herein, may be common law or registered trademarks of third parties affiliated or unaffiliated with the applicant or the assignee. Use of these marks is by way of example and shall not be construed as descriptive or to limit the scope of disclosed or claimed embodiments to material associated only with such marks.

The articles "a," "an," and "the" are intended to include the plural forms as well, unless the context clearly indicates otherwise.

The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the application, ordinal numbers (e.g., first, second, third, etc.) may be used as an adjective for an element (i.e., any noun in the application).

Although terms such as "first," "second," and "third" may be used herein to describe various members, components, regions, layers, or sections, these members, components, regions, layers, or sections are not to be limited by these terms.

Rather, these terms are only used to distinguish one member, component, region, layer, or section from another member, component, region, layer, or section.

The use of ordinal numbers is not to imply or create any particular ordering of the elements nor to limit any element to being only a single element unless expressly disclosed, such as by the use of the terms "before," "after," "single," and other such terminology.

Rather, the use of ordinal numbers is to distinguish between the elements.

By way of an example, a first element is distinct from a second element, and the first element may encompass more than one element and succeed (or precede) the second element in an ordering of elements.

Thus, a first member, component, region, layer, or section referred to in examples described herein may also be referred to as a second member, component, region, layer, or section without departing from the teachings of the examples.

What is claimed is:

1. An apparatus comprising:
    a current source configured to:
        divide current from a voltage supply into a plurality of current streams, produce, by modulating a first one of the current streams with a first signal, a first current stream that mirrors the first signal, produce, by modulating a second one of the current streams with a second signal, a second current stream that mirrors the second signal, and
        supply, in response to combining the first and second current streams into a single current stream, the single current stream to a load in a flow direction;
    wherein the second signal comprising a signal having a pulse width shorter than a pulse width of the first signal.

2. The apparatus of claim 1, wherein the load is a write head for a hard disc drive.

3. The apparatus of claim 1, wherein the first signal is a signal that transition along with a transitioning of data.

4. The apparatus of claim 1, wherein the second signal is a signal that transitions on an edge of the first signal.

5. The apparatus of claim 1, further comprising:
    a current sink configured to:
        divide, in response to receiving the current stream through the load, the current stream into multiple streams of current.

6. The apparatus of claim 5, wherein the current sink is configured to:
    convert, by modulating a first one of the streams of current with the first signal, the first one of the streams of current into a first stream.

7. The apparatus of claim 6, wherein the current sink is configured to:
    convert, by modulating a second one of the streams of current with the second signal, the second one of the streams of current into a second stream.

8. The apparatus of claim 7, wherein the current sink is configured to:
    supply, in response to combining the first and second streams into a single stream, the single stream to a load in a first direction.

9. The apparatus of claim 1, wherein the current source is configured to:
    convert, by modulating a third one of the current streams with a third signal, the third one of the current streams into a third current stream.

10. The apparatus of claim 9, wherein the current source is configured to:
    supply, in response to combining the first, second and third current streams into the single current stream, the single current stream to the load in the flow direction.

11. The apparatus of claim 9, wherein the third signal is a signal having a pulse width shorter than a pulse width of the second signal.

12. The apparatus of claim 9, wherein the third signal is a signal that transitions on an edge of the second signal.

13. The apparatus of claim 1, further comprising:
    an additional current source configure to:
    divide, in response to converting another voltage from the voltage supply into a group of current flows, the current from the voltage supply into the current flows.

14. The apparatus of claim 13, wherein the additional current source is configured to:
    convert, by modulating a first one of the current flows with a first signal, the first one of the current flows into a first current flow.

15. The apparatus of claim 14, wherein the additional current source is configured to:
    convert, by modulating a second one of the current flows with a second signal, the second one of the current flows into a second current flow.

16. The apparatus of claim 15, wherein the additional current source is configured to:
    supply, in response to combining the first and second current flows into a single current flow, the single current flow to a load in a flow direction.

17. An apparatus comprising:
a controller configured to:
create a first signal that transitions along with a transitioning of data, and create a second signal a pulse width shorter than a pulse width of the first signal; and
a current source configure to:
divide, in response to converting a voltage from a voltage supply into a plurality of current streams, a current from the voltage supply into the current streams, convert, by modulating a first one of the current streams with the first signal, the first one of the current streams into a first current stream, convert, by modulating a second one of the current streams with the second signal, the second one of the current streams into a second current stream, and
supply, in response to combining the first and second current streams into a single current stream, the single current stream to a load in a flow direction;
wherein the second signal comprises a signal that transitions on an edge of the first signal.

18. The apparatus of claim 17, wherein the second signal is a signal having a pulse width shorter than a pulse width of the first signal.

19. A method comprising:
creating, by a controller, a first signal that transition along with a transitioning of data, and
creating, by the controller, a second signal a pulse width shorter than a pulse width of the first signal; and
dividing, by a current source in response to the current source converting a voltage from a voltage supply into a plurality of current streams, a current from the voltage supply into the current streams,
converting, in response to the current source modulating a first one of the current streams with the first signal, the first one of the current streams into a first current stream,
converting, in response to the current source modulating a second one of the current streams with the second signal, the second one of the current streams into a second current stream, and
supplying, by the current source in response to combining the first and second current streams into a single current stream, the single current stream to a load in a flow direction;
wherein the second signal comprising a signal having a pulse width shorter than a pulse width of the first signal.

* * * * *